Patented Dec. 23, 1941

2,267,240

UNITED STATES PATENT OFFICE 2,267,240

PROCESS FOR PREVENTING THE DEPOSITION OF DISPERSED SUBSTANCES IN DISPERSIONS

Paul Kümmel, Oranienburg, near Berlin, Germany

No Drawing. Application May 8, 1939, Serial No. 272,521. In Germany May 7, 1938

3 Claims. (Cl. 106—287).

(Granted under the provisions of sec. 14, act of March 2, 1927; 357 O. G. 5)

This invention relates to a process for preventing the deposition of dispersed substances in dispersions, for example in paints containing solid particles in suspension of which the more important are oil and varnish paints. Such paints generally comprise binding agents in the form of a solution having a base of an oil, varnish, or natural or artificial resin in which white, coloured or non-coloured pigments, or blending agents are dispersed. The most important agents consists of or contain drying oils, for example linseed oil, resin oil and the like. Important varnishes are also obtained from a base of resin, or a modified resin of the glycerine phthalic acid series, the glycerine maleic acid series or the like. Of equal importance are paints wherein the binding agent contains cellulose ether or ester or condensation resins and polymerisation resins other than the above-mentioned kinds.

In such binding agents there is dispersed for the formation of oil or varnish paints, coloured or non-coloured pigment with or without the addition of blending agents. The substances added may for example be barium sulphate, mica, talcum and the like, i. e. substances which do not themselves dissolve but remain floating in a fine condition, and a solvent such as benzine may also be added. The suspended particles are inclined after a shorter or longer time to become deposited, i. e. the duration of the suspension is generally limited and the deposited particles have the inconvenient property of adhering together to form a mass of cement-like hardness, which cannot be loosened and brought into suspension again in any manner.

It has already been proposed to overcome this disadvantage by the use of soaps of the alkali earth metals, magnesium, aluminium and other metals, which soaps are insoluble in water but not in benzene and similar organic solvents, but in practice this method does not always produce the desired results and if relied upon absolutely will, in the cases where it is ineffective involve damage to and loss of considerable quantities of paint. Furthermore, in many cases the adhesive or matting effect of earth alkali and metal is very prejudicial.

These disadvantages can be obviated by the present invention by means of which the desired result can be obtained in a simpler and universally reliable manner and for this purpose the invention consists in a process for preventing the deposition of dispersed substances in dispersions, for example in non-aqueous paints and the like characterised by the feature that to the constituents of the paint, for example binding agent, pigment and blending agent is added at least one watersoluble soap of a nitrogenous base, in particular an amine base.

The method according to the invention may be carried out as follows: To the oil and varnish binding agents and solutions containing pigments or separating agents are added, preferably as soon as possible after the addition of the substance to be dispersed, a sufficient quantity—generally 0.1 to 0.2%—of a water-soluble fatty amine base, which if desired may contain one or more free hydroxyl groups in the molecule. The fatty acids are all those which form soaps, for example dodecylic, tetradecylic, hexadecylic, octadecylic, octadecenylic, naphthenic, resinic, ricinoleic or marine fatty acids. As bases, use may be made of ammonia, or ethanolamine, di-ethanolamine, tri-ethanolamine, as well as mixtures thereof, hydrogenated diphenylamine, ethylendiamine, di-ethylentriamine, tri-ethylentetramine and the like as well as mixtures thereof or mixed with ammonium soaps.

The nitrogenous soaps may be added any time after mixing the paint base with the binding agent, but it is preferable to add it soon after the addition of pigment. In any case the addition should be effected before the formation of the above-mentioned cement-like deposit although it is to be noted that even after this has been formed the addition of the soaps can enable the deposit to be again brought into suspension although in this case a considerable amount of energy is required.

In the presence of a small quantity of water the effect may be considerably increased. It is to be noted that water is formed in the formation of soap but an addition of water in excess thereof is advantageous.

Finally, the addition of a resin or a saponified resin, for example coumarone resin or rosin and their saponification products, is of advantage.

The invention is illustrated by the following example but is not limited to the particular details given therein.

10 parts by weight of ethylendiaminoleate (formed from ethylendiamine and oleic acid) and 15 parts of solvent naphtha are mixed together and then 65 parts of ethanol and 10 parts of water are added.

In this way the addition of 1.5% of a nitrogenous soap completely prevents the deposition of the dispersed pigment.

In the above example the oleic acid may be replaced by stearic acid and the base may be replaced by an amine containing hydroxyl groups which produces a further advantage in that the undesired floating of the colouring material is completely prevented.

The added substances may be introduced before the introduction of the pigment and the blending agent but it is to be emphasized that a particular advantage of the invention is to enable the dispersion to be facilitated at a later stage if desired or necessary.

The addition of water previously mentioned sometimes makes necessary the addition of an intermediary solvent for the water and the binding agent. In the above example ethanol is used for this purpose.

Instead of ethanol other water-soluble alcohols may of course be used, as well as acetone, lactic acid, methyl or ethyl glycolate, or glycol or the water-soluble ether or ester thereof.

The process according to the invention is also applicable to other kinds of dispersions for preventing the formation of hard deposits.

Having now particularly described and ascertained the nature of my invention and in what manner the same is to be performed, I declare that what I claim is:

1. A paint comprising a water insoluble paint vehicle, pigment dispersed therein, a small amount of water soluble amine soap, and a small amount of water not less than that produced in reacting an amine and a fatty acid in forming said soap, the soap and water serving to prevent the pigment from settling out as a hard sediment.

2. A paint comprising a water insoluble paint vehicle, pigment dispersed therein, a small amount of water soluble amine soap, water substantially equal in amount to said amine soap, and a water soluble alcohol serving as an intermediary solvent for the vehicle and water, the soap and water serving to prevent the pigment from settling out as a hard sediment.

3. Method of redispersing a sediment of pigment formed in a water insoluble paint vehicle, comprising mixing a water soluble amine soap and a small amount of water into the sediment, the water being not less than that produced in reacting an amine with a fatty acid in forming said soap, and working the mass until the pigment is redispersed into the vehicle.

PAUL KÜMMEL.